Patented June 6, 1950

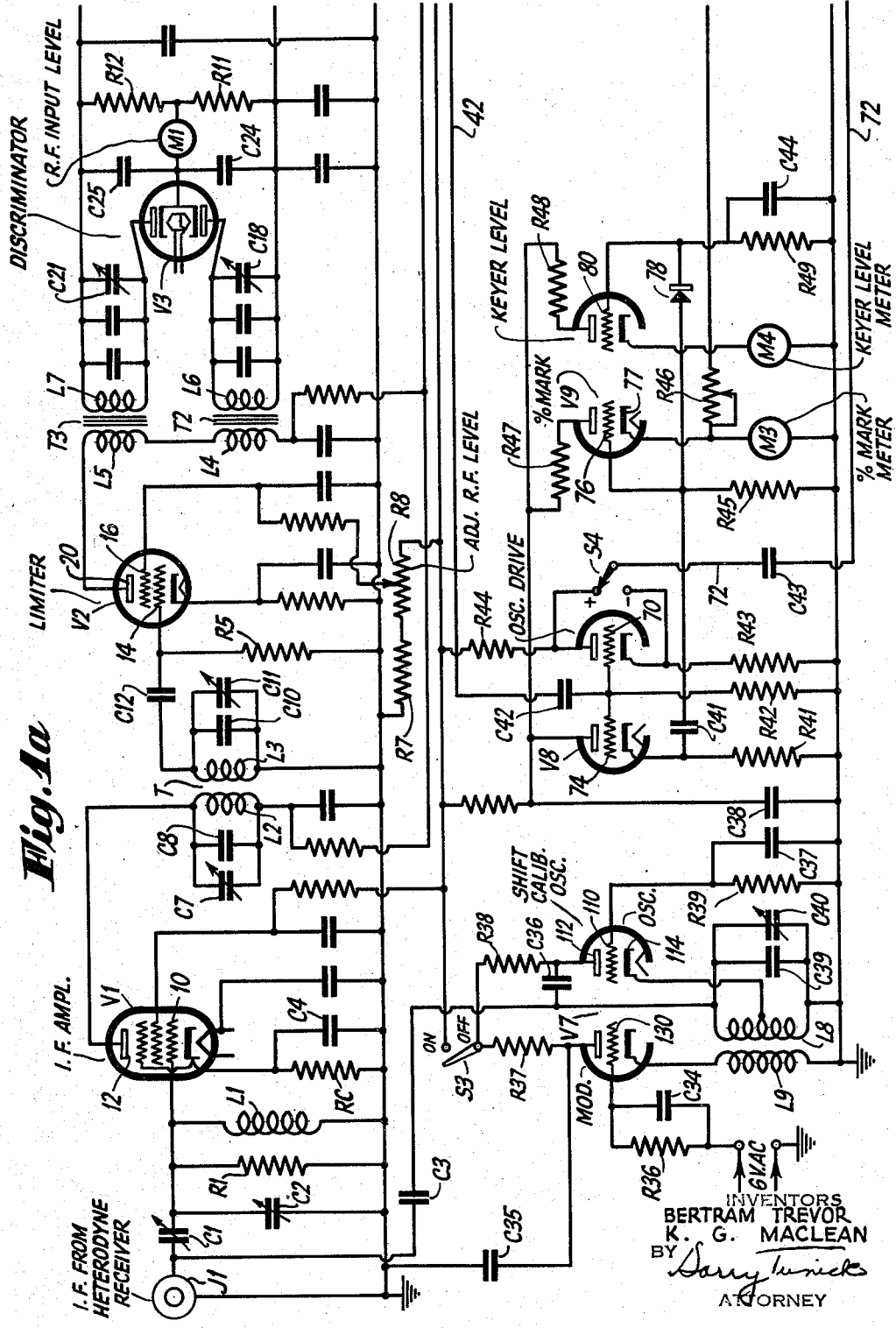

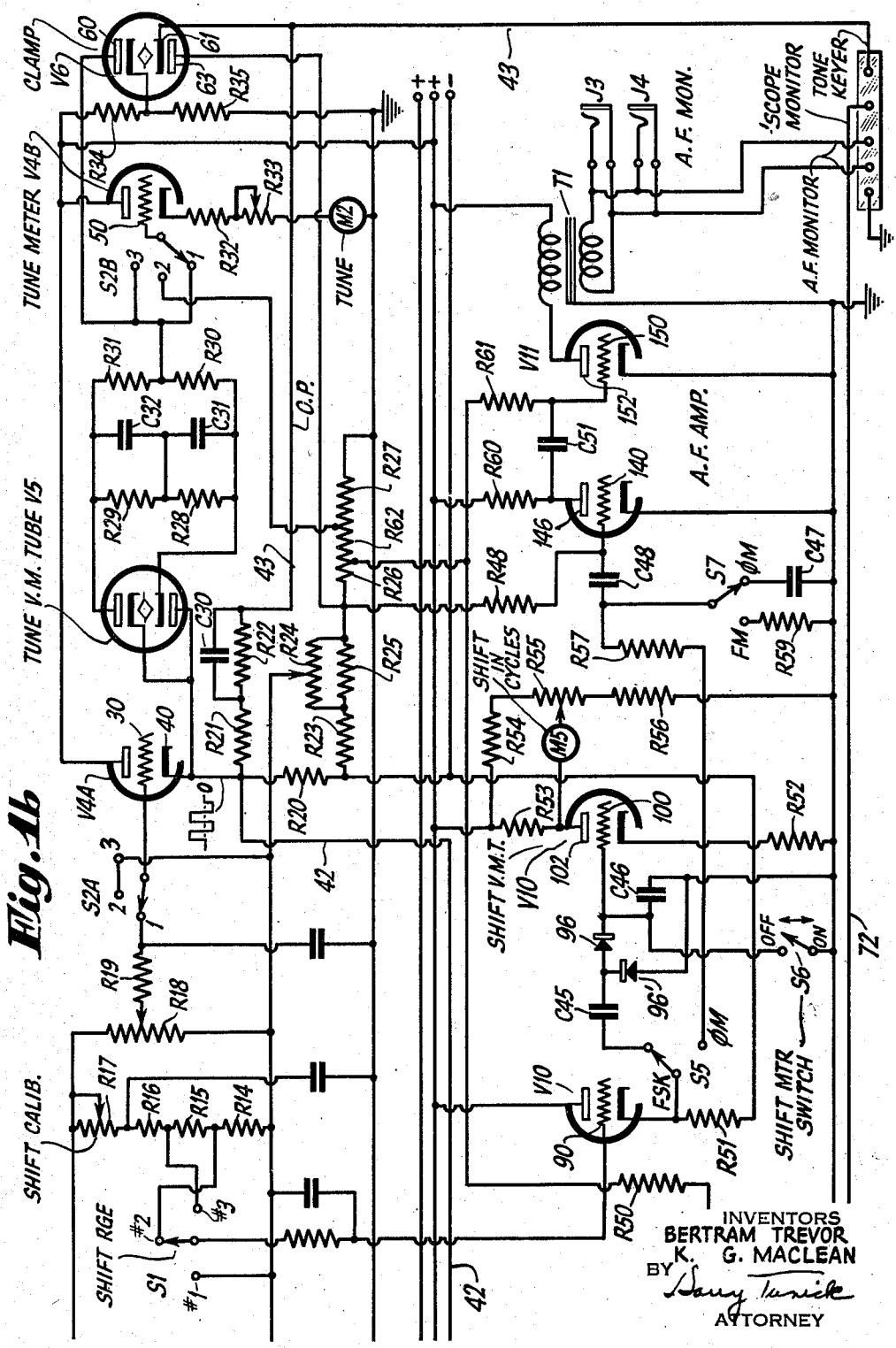

2,510,531

UNITED STATES PATENT OFFICE 2,510,531

TRANSMITTER MONITOR

Bertram Trevor and Kenneth G. MacLean, Riverhead, N. Y., assignors to Radio Corporation of America, a corporation of Delaware Application October 31, 1947, Serial No. 783,278

9 Claims. (Cl. 178—69)

This application discloses a transmitter monitor which is primarily for monitoring frequency shift telegraph transmitters by the operator at the transmitter control point.

Heretofore, telegraphy signalling has been carried on primarily by keying a carrier on and off in accordance with the signal. Monitoring such systems is easy since all that is required is a simple rectifier excited by the transmitter output with the rectifier output filtered and applied to the vertical plates of an oscilloscope. Frequency shift telegraphy is coming into general use and these known monitors are entirely inadequate for monitoring the same. The primary purpose of our invention is to provide a monitor for analyzing all characteristics of frequency shift telegraphy waves.

At the transmitter it is essential to know the extent of frequency shift of the carrier by the signal in order that the said shift can be regulated to meet existing requirements with respect to transmitter design channel assignments, and receiver requirements.

A primary purpose of our invention is to provide means giving an indication in cycles of the peak to peak frequency shifts, which means operates continuously while the transmitter is in use under traffic conditions.

It is also essential to provide a continuous visual indication of the wave shape, keying weight and telegraph bias, if any, of the signal as represented by the modulation on the transmitted carrier. This indication is produced on the target of an oscilloscope and shows defects of the keying wave such as transients.

A further purpose of our invention is to provide driving potentials, which represent the modulation on the transmitter output, to control a tone keyer whose output may be sent over a tone line to a remote point or to a teletype printer and other circuits for monitoring purposes. This tone keyer is to be operated even in case our monitor receiver is detuned slightly.

The monitor of our invention is excited by intermediate frequency output from a receiver, which may be conventional, that must be properly tuned and our monitor also includes a tuning meter which shows the state of the receiver tuning.

A further object is to provide meter indications of the percent mark or keying bias of the transmitted carrier keyed by potentials continuously reversing at a constant rate.

In order to adjust the apparatus used to attain the prior objects, we provide in the monitor a source of carrier current shifted by an accurately known amount which can be fed to the apparatus in place of the received signal sent out by a transmitter. This wave insures accurate checking and calibration of the frequency shift indicator.

In order to properly adjust the signal keying level and other critical levels of the monitoring apparatus, we provide a keyer level meter which provides a continuous indication of the signal level.

A further object is to provide means for monitoring phase and/or frequency modulation of any kind on a transmitted wave.

In describing our invention, reference will be made to the attached drawings wherein the single figure (on two sheets) illustrates by circuit element and circuit element connections a monitor arranged in accordance with our invention.

The signal fed to our monitor is derived from any communication type receiver having appropriate band width, sensitivity and the proper intermediate frequency. The signal to be monitored is tuned in on such a receiver (not shown) and the intermediate frequency output of the receiver is fed into jack J1 which is the input jack of the monitor of our invention. The intermediate frequency output in the example given for descriptive purposes is at 455 kc. per second. The monitor is applicable primarily to frequency shift telegraphy and such a signal may be impressed at J1. However, as described hereinafter, provision is made for monitoring frequency or phase modulated program transmitters.

Capacitor C1 taken with capacitor C2 and with inductor L1 constitutes a broad band impedance matching input circuit to the grid 10 of the intermediate frequency amplifier stage tube V1. The anode 12 of tube V1 is coupled by transformer T to the control grid 14 of tube V2 which is operated as a voltage and/or current amplitude limiter. The transformer T has a primary inductor L2 with tuning capacitors C7 and C8 and a secondary inductor L3 with tuning capacitors C10 and C11. The transformer is coupled and tuned in the example described to have a flat band width of 10 kc.

The resistor R5 connecting the grid 14 to ground taken in conjunction with the coupling capacitor C12 forms a conventional grid biased limiting circuit. To maintain a calibration of the discriminator including tube V3 described hereinafter, the intermediate frequency level at the input thereof should be held above the limiting value. The limiter tube V2 with its adjustable screen voltage supply source potentiometer R8 and with the gain control in the receiver supplying intermediate frequency energy to jack J1 serve to hold the D.-C. level, as read on meter M1, at the value used at the time of calibration. The screen grid 16 of tube V2 then is connected to a movable tap on potentiometer R8 which is in a voltage divider circuit across the high potential source.

The anode 20 of tube V2 is connected in an output circuit including in series inductors L4 and L5 which comprise respectively the primary windings of transformers T2 and T3. The secondary windings of these transformers comprise inductors L6 and L7 respectively shunted by tuning capacitors including adjustable capacitors C18 and C21 respectively. The secondary windings of transformers T2 and T3 are each in a rectifier circuit including diodes in a common envelope in tube V3. Separate diode tubes may be used. The discriminator tuned circuits L5—L7 and L4—L6 may be mutually coupled to improve the linearity of the discriminator. L5—L7 is tuned, in the example given, to 450 kc. L4—L6 is tuned to 460 kc. providing a slope circuit having peaks separated by 10 kc.

The load of the rectifier connected with inductor L6 is resistor R11 while the load for the rectifier in series with inductor L7 comprises resistor R12. The resistors are connected in opposed polarity with the connections such that when current flows through the resistors, the potential drops therein are positive at the junction points between the resistors and negative at the ends of the resistors connected to the anodes of the diodes. The resistors are shunted for voltages of intermediate frequency and higher by capacitors C24 and C25 respectively. The radio frequency input level meter M1 is common to the rectifier circuits, being connected between adjacent terminals of resistors R11 and R12 and the cathodes of the diodes. The calibrated intermediate frequency level is monitored by the meter M1 which reads the total discriminator current. An output or load circuit, comprising resistors R14, R15, R16 and R17, is connected in series across the rectifier load resistors R11 and R12. A switch S1 is arranged to connect a selected point on the detector output circuit to a frequency shift voltmeter tube V10 described hereinafter. The original modulation intelligence of a frequency shifted or frequency modulated signal appears across the resistors R14 to R17 inclusive and as a consequence, across R18 in shunt thereto.

A point on potentiometer resistor R18 is connected by resistor R19 to the control grid 30 of an electron discharge device V4A when the switch S2A is in the position shown. The tube V4A is a cathode driver with cathode load resistor R20 and isolates the discriminator and detector from the various output circuits now being described. The cathode driver stage including tube V4A supplies output for four purposes. Its cathode 40 is connected to a tuning voltmeter tube V5, by lead 42 to the control grids of a double tube system V8 and by resistors R21 and R22 to an output lead 43 labeled tone keyer.

The output of the cathode driver tube V4A fed to tube V5 is used to insure proper tuning of the receiver to the center of the discriminator circuit characteristic. This is accomplished by supplying current representing the discriminator and detector output to a tuning meter M2 in the cathode circuit of a tube V4B which may be in a common envelope with the tube V4A or may be in a separate envelope. The cathode 40 of tube V4A is connected directly to the anode in one of the diodes of tube V5 and also directly to the cathode of the other of the diodes in tube V5. The cathode and anode respectively of the said diodes of this voltage doubler rectifier are connected to a rectifier load comprising resistors R28 to R31 shunted by filtering capacitors C31 and C32. With frequency shift keying having "mark" and "space" frequencies equally spaced about the discriminator center, the voltage of cathode 40 of the tube V4A, is keyed equal amounts above and below a potential corresponding to the discriminator center frequency. The two diodes of V5 each maintain across their respective load resistors R28, R29 and capacitors C31, C32 in opposite polarity, the peak values of the voltage excursions of cathode 40. Therefore, with keying centered in the discriminator, the junction of equal resistors R30, R31 gives a potential at grid 50 of tube V4B, equal to the discriminator center voltage of cathode 40. With keying not centered in the discriminator cathode 40 has unequal voltage excursions about the center potential which produces at grid 50 a new D.-C. potential above or below the center value, depending upon whether the keying is displaced above or below the discriminator center frequency. The junction point of resistors R30 and R31 is connected, in the switch S2B position shown to the control grid 50 of the tuning meter tube V4B, which has the meter M2 in its cathode return circuit in series with resistors R32. Note that switches S2A and S2B are ganged. The diode V5 with its resistor load and bypass capacitors is a peak-to-peak voltmeter with slow time constants so that the frequency shift telegraphy signals of variable weight or percent mark set up a steady bias on the grid 50 which causes steady current to flow in the meter M2 when frequency shift or similar telegraph signals of variable weight are fed to the discriminator.

The anode 60 of the double diode in clamp tube V6 is connected to the tap on resistors R30 and R31 while the cathode of this tube is connected to a potential divider including resistors R34 and R35. The biases are such that if the direct current potential on the anode 60 and at the point between the resistors R31 and R30 becomes excessively positive, the diode tube will conduct to discharge and lower this potential. In this manner, the tube V4B is protected from excessive grid potentials and the adjustment is such, in the example given, that the tube V6 conducts when the potential on the grid 50 exceeds +5 volts.

Another output from the cathode 40 of the cathode driver tube V4A is through resistor R21 and capacitor C30 to a tone keyer externally located, if desired. The tone keyer tube grid (not shown) provides a clamp to limit the positive voltage fed to the keyer to about zero volts while the lower half of the clamp tube V6 prevents the tone keyer from receiving more than minus 4 volts so that in spite of moderate detuning of the signal due to the receiver drift, a constant level is fed to the tone keyer. The protection is supplied by the tone keyer grid with respect to positive voltages because if the grid tends to swing positive, grid rectification takes place to make the grid potential negative. If the negative level is excessive, the cathode 61 of clamp tube V6 becomes negative relative to the anode 63 and discharge takes place to limit the negative peaks.

By moving the switches S2A and S2B to the number two and three positions and adjusting resistors R33 and R24, the bias of tubes V4B and V4A can be made such as to bring tuning meter M2 pointer to center scale with no signal input and/or with signal input properly tuned to the center frequency of the discriminator. In order to provide symmetrical D.-C. keying to the tone keyer over lead 43, it is desired that the center or base potential of cathode 40 be maintained at −2 volts in the example given. Under this condition tuning meter M2 is adjusted by means of R33 to read center scale after setting switch S2B to position two, thereby connecting grid 50 of tube V4B to a fixed potential of −2 volts from the potential divider R23 to R27. Position 3 of switches 2A and 2B permits adjustment, by means of resistor R24, of the potential of grid 30 of tube V4A, which in turn causes the potential of cathode 40 to vary in a similar manner. Resistor R24 is adjusted in this case to give a potential at cathode 40 of −2 volts, which is indicated by a center reading of meter M2. Now with the switches returned to the number one position, the receiver may be tuned, if necessary, to supply at jack J1 an average intermediate frequency which is centered on the discriminator characteristic, this being indicated by zero or center scale reading on the meter M2.

The output of tube V4A appearing across resistor R20 is also supplied by lead 42 and capacitor C42 to the grid 70 of the right hand section of a double tube V8 which has two output load impeders, R43 adjacent the cathode and R44 adjacent the anode, both in the direct current path of tubes V8. The right hand section of this tube V8 thus operates as a phase inverter so that the output at the anode may be considered positive and the output at the cathode may be considered negative and these plus and minus signals may be supplied by reversing switch S4 and lead 72 through a condenser C43 to a monitoring oscilloscope, not shown.

The output from the cathode driver V4A also is coupled through lead 42 to the control grid 74 of the left hand section of tube V8, which is a cathode driver tube supplying output from its cathode resistor R41 through capacitor C41 to the control grid 76 of the left hand tube section of tube V9 used with percent mark meter M3 and also to a rectifier 78 supplying output to the control grid 80 of the other section of the tube V9 which has a keyer level meter M4 in its cathode return.

The left hand section of tube V9 with meter M3 is used to facilitate adjustment of the keying weight or percent mark at the transmitter. To do this, the transmitter must be keyed by constant frequency reversals (not necessarily 50% mark) and the modulation circuits are adjusted for the desired percentage mark which may be changed through a range of 20 to 80% as indicated on the meter M3 when the transmitter signal is fed to jack J1. Then the current flowing in the meter M3 will be of a magnitude depending upon the percent mark. Frequency shift telegraphy signals normally use a shift to higher frequencies to represent mark. The polarity of the discriminator is chosen such that this produces a negative going voltage for mark at the grid 76 of the left hand section of tube V9. The cathode 77 of this section of tube V9 is grounded through meter M3 so that the grid cannot be made materially positive relative to the cathode. In the presence of mark the potential at the left hand cathode of tube V8 swings in a negative direction. Therefore, the grid to cathode impedance of the left hand section of tube V9 acting as a diode will conduct only on positive going or space signal intervals and the average D.-C. voltage developed on this grid will vary with the relative length of the mark and space intervals. The meter M3 readings follow the average grid voltage. The resistor R47 is chosen so that a plate current change of .6 milliampere occurs when the percent mark is varied from 20% to 80%. In establishing this operating condition, the bias on the grid 76 is also selected as desired by grid bias resistor R45. A compensating current for meter M3 is supplied by resistor R46 and R50 connected to a negative point on the potential divider described hereinbefore comprising resistors R23, R24, R25, etc. Resistor R46 is variable and is adjusted to give .5 milliampere in the meter M3 with 50% mark. This mark meter reads the percent mark directly from about 20% to 80% mark.

The left hand grid-cathode section of tube V9 with the crystal rectifier 78 and capacitors C41 and C44 comprise a voltage doubler rectifier or peak-to-peak rectifier for the keying wave envelope. The keying wave appears across the cathode load R41 of the left hand section of tube V8 and is fed from this load through capacitor C41 to the grid 76 and the cathode of the rectifier 78, the anode of which is connected to the control grid 80. The negative going potentials are rectified in the rectifier 78. The positive going potentials are rectified in the grid circuit of the left hand section of tube V9. A potential representing the rectified peak-to-peak keyed wave envelope appears at the anode of rectifier 78 and across load resistor R49 shunted by filtering capacitor C44 and is applied to the control grid 80 of the keyer level meter tube. The average strength or peak-to-peak level of the keyed signal appearing across R41 is registered in the meter M4 in the cathode return circuit of the right hand section of tube V9. This meter is a means for monitoring the critical levels involved in performing the various operations outlined above. This level is kept at the correct value by adjustment of potentiometer resistor R18 at the discriminator detector output.

The left hand section of tube V10 is a cathode driver stage having its control grid 90 coupled by the switch S1 in the position shown to a point on the voltage divider across the output of the discriminator detector and this tube has its cathode load resistor R51 coupled by the switch S5 in the position shown to a coupling capacitor C45 in turn coupled to rectifiers 96—96' supplying the grid 100 of the right hand stage of tube V10 which has in its anode circuit a meter M5 which indicates the total shift of a frequency shift telegraph signal. The cathode driver section load resistor R51 is connected to a negative point on the potential source while the anode of the left hand section of tube V10 is connected to a positive point on this source. The frequency shift signal supplied to the grid 90 from the discriminator detector output appears across the load resistor R51 and is fed by coupling capacitor C45 to the anode and cathode respectively of the two crystal diodes 96' and 96. The diodes 96 and 96' with capacitors C45 and C46 form a voltage doubler rectifier. The positive going potentials are rectified by the rectifier 96'. The negative going potentials are rectified by the rectifier 96. The rectified signals appear on the control grid 100 of the right hand section of tube V10 to vary the bias thereon and thereby vary the plate current in this tube and the current flowing through the total shift indicator meter M5, in proportion to the peak positive to negative excursions of the signal envelope appearing in the discriminator detector output. The anode 102 of this section of tube V10 is connected by resistor R53 to a positive point on the direct current supply source and by meter M5 to a voltage divider including resistors R54, R55, and R56 in shunt to this source. By adjusting potentiometer R55, we make the meter M5 read zero with no signal input, obtained when the switch S1 is on the #1 position, that is, to the left. Resistors R14 and R15 are so proportioned that an accurate voltage ratio of 1 to 10 is obtained at the output switch arm, the voltage at the #2 contact being 1/10 of that at the #3 contact. With a frequency shifted signal of a known shift fed into the system at the intermediate frequency stages R17 may be adjusted to calibrate the shift meter to read that shift. The switch S1 is then in position #2. Thereafter, if switch S1 is switched from position #2 to position #3, the ten to one voltage divider action provided by R14, R15 changes the range of meter M5 to one-tenth of its previous range and correspondingly increases its sensitivity. When the frequency shift meter switch S6 is in the "on" position as shown, the potential developed as described above appears on the control grid 100 of the right hand section of tube V10. When this meter is not to be used, switch S6 is closed in its meter "off" position and the right hand section of tube V10 is no longer effective. It should be noted that the frequency shift indication at meter M5 reads frequency shift during all conditions of traffic and M5 is not sensitive to changes in keying bias or percent mark, due to the long time constant of the peak-to-peak rectifier circuit driving grid 100 of tube V10.

To maintain a check on the calibration of the frequency shift meter described in the preceding paragraph, we provide a source of oscillations continuously shifted through a known range. To do this, we have provided a novel oscillator using the right hand section of tube V7 and an improved means for modulating the same using the left hand section of tube V7. The right hand section of tube V7 is connected in a substantially conventional Hartley oscillator with the control grid 110 grounded by capacitor C37 shunting bias resistor R39, with shunt feed to the plate 112 through resistor R38. One end of L8 is grounded being thereby connected to the control grid 110, the other end of L8 being coupled to anode 112 through capacitor C36. A point on the inductor L8 is coupled to the tube cathode 114. The oscillator output is supplied by capacitors C3 and C36 to the capacitor C1 at the input of the intermediate frequency amplifier V1. The inductor L8 with capacitors C39 and C40 comprise the tank circuit of the oscillator. An inductor L9 is coupled to the inductor L8. The inductor L9 is included in the cathode circuit of the left hand section of tube V7 which is the modulator tube. The anodes of the two tubes in V7 are coupled by switch S3, when closed, to the plate potential source and the resistor R37 in the plate circuit of the left hand section of tube V7 is bypassed for voltages of the generated frequency by capacitor C35. Six volts alternating current at say 60 cycles per second is fed to the grid 130 of the left hand section of tube V7 through resistor R36 shunted by capacitor C34. The action of the resistor and capacitor in the grid circuit is to maintain an average negative bias at the grid 130 so that this tube conducts only on positive swings of the grid voltage at 60 cycles per second. The resulting plate current approaches a square wave of about 50% mark. That is, the plate current output flows about 50% of the time and is of substantially square wave form. The inductor L9 in the cathode circuit, due to the fact that the left hand section of the tube V7 is alternatively conductive and nonconductive, is correspondingly short circuited or open circuited, being short circuited (through the left hand tube cathode impedance) when the tube is conductive and open circuited when the tube is cut off. When open circuited, L9 has a negligible effect on inductor L8 but when inductor L9 is short circuited the mutual inductance developed between inductors L8 and L9 causes the inductance of inductor L8 to decrease thus raising the frequency of operation of the oscillator in the right hand section of tube V7. Thus, the frequency of the oscillations developed go up as required on mark and the adjustment of the coupling between inductors L8 and L9 is such as to make this increase in frequency about 1,000 cycles so that a square wave keyed source of this shift is then fed to the input of the intermediate frequency amplifier stages. The oscillator frequency is adjusted to the intermediate frequency from the heterodyne receiver by means of capacitor C40 and this square wave keyed source of 1,000 cycles shift is fed to the discriminator and supplies a frequency shifted or keyed wave to check the calibration of the meter M5. The oscillator and modulator in tube V7 exhibit high stability due to the degenerative effect of inductor L9 in the left hand section of tube V7's cathode and due to the low impedance of the cathode when driving L9 to short circuit.

If desired a small variable capacitor and suitable damping resistor may be shunted across inductor L9. Adjustment of this capacitor will allow small changes of the frequency shift to be made without changing the coupling between L9 and L8.

As stated above, we also provide means to monitor frequency or phase modulated program transmission. To do this, we provide a pair of tube systems in a tube V11 connected as an amplifier. The control grid 140 of the left hand section of tube V11 is coupled by capacitor C48 and resistor R57 and switch S5, in the phase modulation position labeled $\phi$M, to the cathode resistor R51 of the left hand section of V10 so that output from the discriminator is supplied through resistor R57 to the control grid 140. The resistor R57 and capacitor C47 attenuate the high frequencies in a well known manner to produce uniform audio output when a phase modulated signal is being received on the discriminator and detector which is essentially a frequency modulated wave detecting system. Switch S7 is then in the position shown and when moved to the FM position, removes the shunt capacitor C47 to give a flat audio response. This switch position is used when receiving straight frequency modulated signals. At the same time this switch in the FM position includes resistor R59 in the input circuit to prevent overloading of the left hand section of tube V11 when capacitor C47 is removed. The anode 146 of the left hand section of tube V11 is in a conventional RC audio amplifier circuit including resistor R60 and capacitor C51 which supplies the voltage developed at the anode 146 to the control grid 150 of the right hand section of this tube. The anode 152 is transformer coupled to jacks J3 and J4 into which the audio frequency monitor may be coupled. The second stage is a conventional transformer coupled output circuit including transformer T1 and since the two stages are conventional, a detailed description thereof other than that above will not be given.

No calibration system is incorporated for monitoring for phase or frequency modulation but such a calibration may be made by feeding the output of the right hand section of tube V11 to a db pad and a volume indicator system. With a known degree of phase or frequency modulation input the volume indicator is read. Values of modulation relative to this level may then be read on the indicator.

The power supply circuits and connections have in a large part been left undescribed since they are conventional and are not shown in the drawings and are understood to those versed in the art.

What is claimed is:

1. In frequency shifted wave analyzing means, a detector excited by current the amplitude of which is shifted in a manner corresponding to shifts in the wave frequency, a potential divider coupled to the output of said detector, at least two connections to said divider at points where the ratio of the potentials appearing thereat, when the detector is operating, is known, a peak-to-peak potential reading voltmeter, and a switch to connect said voltmeter to a selected one of said two connections.

2. In a monitor for analyzing wave energy the frequency of which is shifted between two values in accordance with signals, in combination, an amplifier for amplifying said wave energy, a frequency discriminator and detector coupled to said amplifier for demodulating said wave energy to produce voltage variations corresponding to the frequency shifts of said wave energy, a peak-to-peak voltmeter coupled to said detector for producing indications of the variations of the produced voltages and consequently the extent of frequency shifts of said wave energy, and apparatus for calibrating said voltmeter comprising an oscillation generator of a frequency substantially equal to the frequency of the wave energy, means for shifting the frequency of the generated oscillatory energy through a known range at a recurring rate, and means for feeding the frequency shifted oscillatory energy to the input of said amplifier.

3. A monitor as recited in claim 2 including a current meter in a direct current circuit of said detector for checking the operation of the discriminator and detector.

4. In a monitor for analyzing wave energy the frequency of which is shifted between two values in accordance with signals, in combination, an amplifier for amplifying said wave energy, a frequency discriminator and detector coupled to said amplifier for demodulating said wave energy, and impedance coupled to said detector, in which impedance voltage variations corresponding to the frequency shifts of said wave energy are produced, a voltage divider comprised of at least two resistors in shunt to said impedance with said resistors so proportioned that the voltage drop across one resistor is a known factor of the voltage drop across the other resistor, a voltmeter for producing indications of the peak-to-peak variations of the produced voltages and consequently the extent of frequency shifts of said wave energy, a switch for coupling said voltmeter to one or the other of said resistors, and apparatus for calibrating said voltmeter comprising an oscillation generator of a frequency substantially equal to the frequency of the wave energy, means for shifting the frequency of the generated oscillatory energy through a known range at a recurring rate, and means for feeding the frequency shifted oscillatory energy to the input of said amplifier.

5. A monitor as recited in claim 4 wherein said voltmeter indicates average current intensity and wherein a full wave rectifier and voltage doubler is in the coupling between said one or the other of said resistors and said voltmeter.

6. In a monitor for analyzing wave energy the frequency of which is keyed between two values in accordance with mark and space signals, in combination, a tunable amplifier for amplifying said wave energy, a frequency discriminator and detector coupled to said amplifier for demodulating said wave energy, an impedance connected to said detector in which impedance voltages keyed in a manner corresponding to the frequency shifts of said wave energy are produced, a cathode driver stage coupled to said impedance, said cathode driver stage having an output impedance wherein voltage variations keyed in a manner corresponding to variations in the frequency of said wave energy appear, a current intensity meter, a full wave rectifier coupled to said second-named impedance, said full wave rectifier having opposed output impedances shunted by capacitors, the time constants of the last named impedances and capacitors being long with respect to the keying rate so that a bias is developed at said last-named impedances which is dependent on the tuning of said amplifier irrespective of the percent mark, and a connection between said meter and said last-named impedances.

7. A monitor as recited in claim 6 wherein said last named connection includes an electron discharge device having input electrodes coupled to said last named impedances and having output electrodes in a circuit including said meter.

8. A monitor as recited in claim 7 including a positive voltage peak limiter in shunt to the input electrodes of said device.

9. In apparatus for producing indications of the peak deviations of frequency shifted energy, in combination, means for producing varying potentials the peak values of which change in a manner corresponding to the deviation peaks of said wave energy, an electron discharge device having input and output electrodes, a meter in circuit with the output electrodes of said device, a full-wave rectifier coupling said means to the input electrodes of said device, a source of oscillatory energy of known frequency, modulated through a known range at recurring intervals, and means for feeding said modulated oscillatory energy to said first-named means in order to calibrate said meter.

BERTRAM TREVOR.
KENNETH G. MacLEAN.

REFERENCES CITED

The following references are of record in the file of this patent:

UNITED STATES PATENTS

| Number | Name | Date |
|---|---|---|
| 2,279,319 | Honaman | Apr. 14, 1942 |
| 2,285,088 | Helmert | June 2, 1942 |
| 2,417,543 | Chapin | Mar. 18, 1947 |
| 2,477,962 | Chapin | Aug. 2, 1949 |